INVENTORS
Maurice D. Walker &
Jimmie K. Sanders
BY
ATTORNEYS

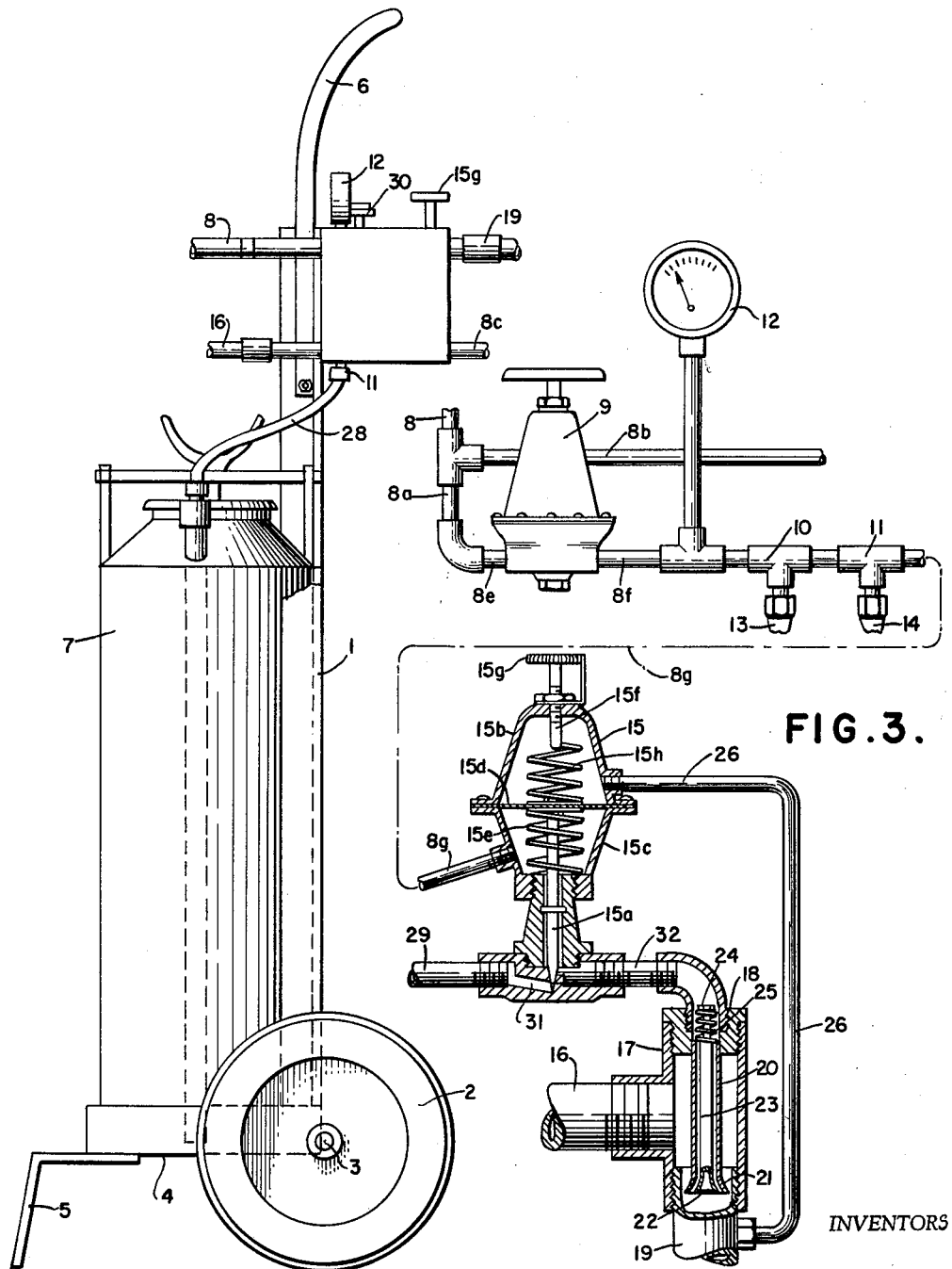

3,194,438
CLEANING AND SANITIZING MACHINE
Maurice D. Walker and Jimmie K. Sanders, both of Corner Elm and Mathis Sts., Blytheville, Ark.
Filed Nov. 19, 1964, Ser. No. 412,465
12 Claims. (Cl. 222—61)

Our invention is a novel portable machine designed for cleaning and sterilizing food plants, washing automobiles, degreasing automobile motors and machines, and in fact can be used anywhere where there are available outlets for water and air from suitable sources of supply, the machine being mounted on a wheeled frame in the nature of a dolly so that it can be very easily moved around from one operation to another, or from one department to another, the machine being of small compact size so that it can be readily stored when not in use.

The principal objects of the invention are to provide a machine of the above type which will utilize or take a desired amount of chemical cleaner or concentrate and dispense same at a desired ratio into a water hose leading to a nozzle; also will direct air under pressure which is added at the nozzle to give increased force to the stream of water; also to provide a machine of the above type having direct air and water lines therethrough leading to a combination air and water nozzle used for cleaning and rinsing at high pressures, the air and water being adjusted at the nozzle; also to provide a machine of the above type having a secondary air line including a manifold connected by high pressure lines leading to the top of two high pressure tanks containing liquid cleaners and chemicals, the manifold having a pressure regulator and an air pressure gauge therein which permits a desired constant pressure to be maintained on the tops of the liquid cleaners and chemicals or concentrates in the pressure tanks; also to provide on the outlet side of the chemical pressure tanks dip tubes extending to the bottoms of the tanks which in turn direct the liquid concentrate through high pressure hoses to a second manifold, each hose having an adjustable orifice valve to adjust the amount of flow of liquid concentrate; also to provide beyond each orifice valve in advance of the manifold a globe valve whereby each tank can be turned on or off, allowing only water and air to flow through, the water and air being turned off respectively by suitable valves at the nozzle. From the first manifold the liquid is carried to the rear end of a T in the main water line, at which point the water supply makes a 90° turn. At this T there is provided a back pressure valve extending into the water line which opens when water is flowing therethrough, releasing the chemical cleaners or concentrate which pass with the water to the nozzle; also to provide means whereby when the water flow is restricted at the nozzle the back pressure in the water hose will close the back pressure valve, allowing a smaller amount of cleaner to enter the water line, thus giving a consistent ratio of mixture. The amount of any chemical or concentrate mixed with the water can be adjusted by the orifice valves and by the amount of air pressure on the tanks.

We will explain the invention with reference to the accompanying drawings which illustrate several practical embodiments thereof to enable others familiar with the art to adopt and use the same; and will summarize in the claims, the novel features of construction, and novel combinations of parts, for which protection is desired.

In said drawings:

FIG. 2 is a side elevational view thereof.

FIG. 3 is an enlarged view of the secondary air pipe and valve arrangement and also showing in enlarged cross-section the back pressure regulator and mixing valve shown in FIG. 1.

Figure 1:
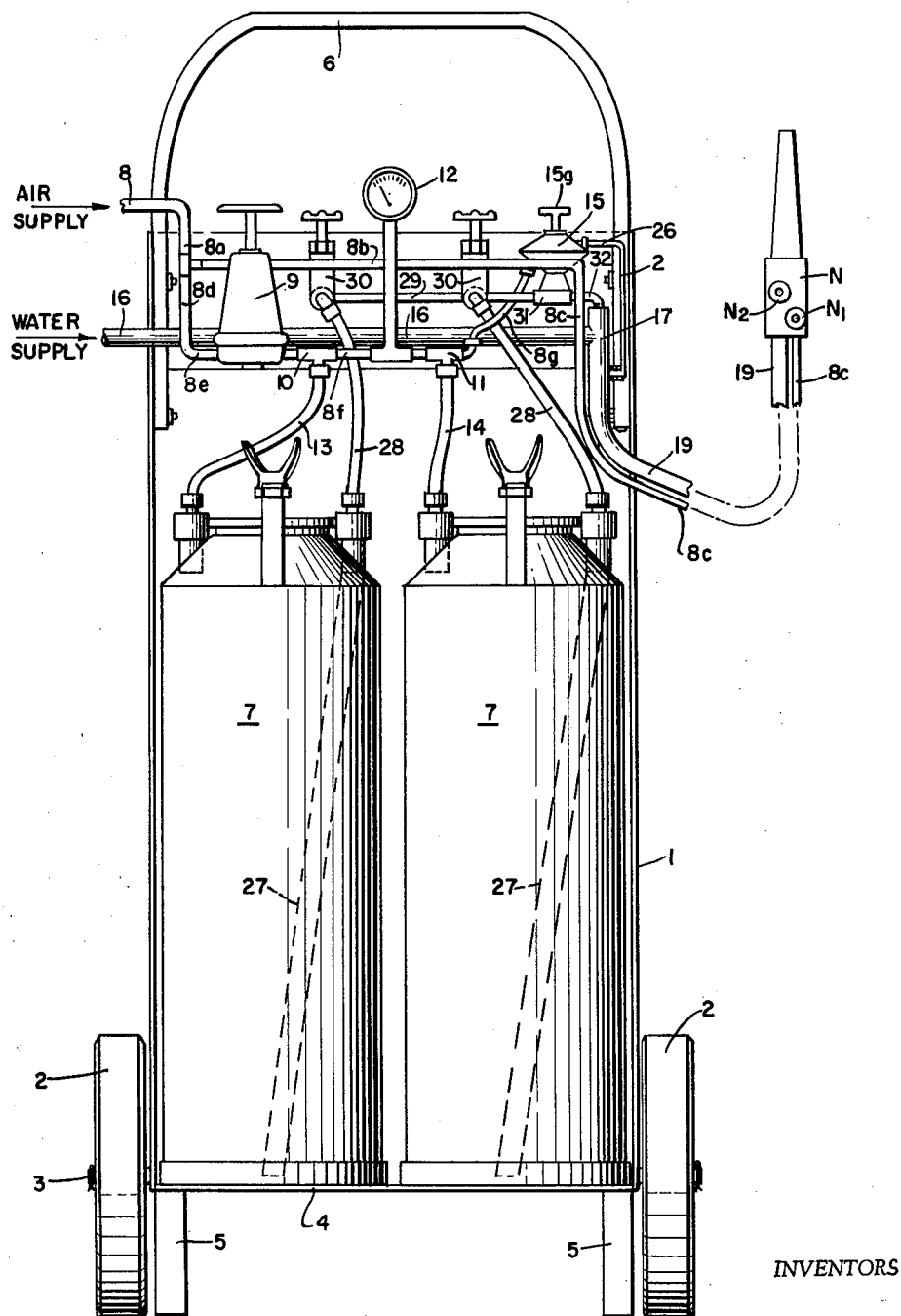
FIG. 1 is a front elevational view of our novel machine.

As shown in FIGS. 1 and 2, our novel cleaning and sanitizing machine includes a substantially rectangular frame 1, normally disposed in substantially vertical position with its lower end resting on wheels 2 on the axle 3 journaled at the lower end of the frame 1 at the rear face of the frame. At the front face thereof is a shelf 4 or the like substantially horizontally disposed and adapted to receive thereon the pressure tanks 7 hereinafter referred to. At the outer end of the shelf 4 are legs 5 whereby in normal position the frame 1 will rest vertically upon the ground surface, but when tilted may be readily moved on wheels 2 in the nature of a dolly. An arched handle 6 extends above the upper end portions of the sides of the frame 1 to assist in moving the tilted dolly from place to place. The details of construction of the dolly 1–6 forms no part of our present invention.

Upon the shelf 4 are two pressure tanks 7; however, it is understood that the shelf may carry additional pressure tanks for holding different cleaning or sterilizing chemicals or concentrates if desired. Preferably the tanks 7 are high pressure stainless steel tanks having quick and easy removable covers to allow for easy refilling, and tanks 7 are coated with a chemical resistant lining to protect same against chemical damage.

Direct air and water lines are provided through the machine to a combination air and liquid nozzle N having separate air and water valves N', N2. The main air supply pipe 8, FIGS. 1 and 2, may be connected by a quick detachable connection to a suitable air supply and enters at one side of the frame 1 and extends downwardly as at 8a and across lateral branch 8b to a point adjacent the opposite side of frame 1, then downwardly through branch 8c to the inlet of the nozzle N, the nozzle having a customary air valve N' therein in the usual manner.

The branch 8a continues downwardly as at 8d, FIG. 1, and terminates in a horizontal branch 8e, the branch 8e forming a secondary air line and passing into an air regulator 9, FIG. 1, the outlet from the air regulator 9 being connected to branch 8f, FIG. 1, having therein a pair of spaced T's 10–11, respectively, and an air gauge 12. The T 10 is connected by a flexible hose 13 to the top of one pressure tank 7, while the T connection 11 is connected by a flexible hose 14 to the top of the other tank 7. The connections of the hoses 13 and 14 to the T's 10–11 and to the tanks 7 are prefrably of quick detachable type to allow quick changing of tanks to facilitate replacement or refilling of the tanks with chemicals. Beyond the T fitting 11 of pipe 8f the pipe continues as at 8g to and discharges into a back pressure regulator 15, hereinafter described, the air entering the pressure regulator 15 below the diaphragm 15d thereof, as indicated in FIGS. 1 and 3.

The water supply pipe 16 extends horizontally of the frame 1 adjacent the upper end thereof below the back pressure regulator 15 and preferably has on its outer end a quick detachable connection to a source of supply water under pressure, while the opposite end of the water pipe 16 enters the side of a vertically disposed casing 17 of a mixing valve, which casing 17 is closed at its top by a plug 18, FIG. 3, while its lower end is connected by hose line 19 to the water inlet end of the nozzle N. Thus the water passes from pipe 16 into the mixing valve 17, at which point chemicals may be added to the water prior to its passage to the nozzle N, the mixing chamber 17 being disposed below and adjacent to the back pressure regulator 15, as shown in FIGS. 1 and 2.

As shown in FIG. 3, the plug 18 has a central bore in which is mounted a tube 20 which extends from the plug 18 to a point below the connection of water pipe 16, and has a flared outer end 12, FIG. 3, forming a valve seat for a mixing valve 22 of smaller diameter but flared to conform with the curvature of the valve seat 21, valve head 22 being carried at the lower end of a valve rod 23 which is disposed axially within the sleeve 20 and extends into the bore of the plug 18, as shown in FIG. 3, the extended portion being of reduced diameter and having a head 24. On the reduced portion of the valve stem 23 is a coiled spring 25 disposed between the upper end of the stem 23 and the head 24 and normally maintaining the valve head 22 seated in the seat 21 so that the water passing around the sleeve 20 from the pipe 16 to the outlet hose 19 will create a vacuum which will tend to unseat the valve 22, whereby any chemicals contained within the sleeve 20 will be permitted to mix with the water as it passes through hose 19 to the nozzle. Thus any chemicals in pipe 20 may be injected into the water line through the mixing valve 21–22, which valve also acts as a check valve, for reasons hereinafter explained. This valve consists of the tube 20 with a flared end 21 inserted into the water line, and the smaller solid rod 23 with flared head 24 inserted into the larger tube. On the other end of the rod there is a very light tension spring 25 which will close the valve when pressure on both sides of the valve is equal, or when water pressure becomes greater than the air pressure on the chemical tanks 7. This will prevent water from entering the chemical tanks 7. The water flows around the flared end 21 of tube 20 which restricts the water somewhat. This gives the water a whirling effect. The chemicals from tanks 7 flow between the inner wall of the tube 20 around the rod 23 and enter the water at the flared ends of this valve arrangement, thereby mixing the chemicals and water. As shown in FIG. 3, a pipe 26 connects the water outlet pipe 19 just below the lower end of the sleeve 20 with the back pressure regulator 15 above the diaphragm 15d therein to admit water under pressure into the back pressure valve 15 above the diaphragm, for the purpose hereinafter explained.

As previously stated, the tanks 7 are adapted to hold suitable chemicals or concentrates such as for cleaning and sanitizing, which chemicals within the tanks remain under air pressure through hoses 13 and 14 controlled by the air regulator 9. The chemicals in the tanks are discharged by such air pressure through dip tubes 27 extending down into the tanks 7 and terminating adjacent the lower ends thereof, said tubes at their upper ends being connected by quick detachable connections to hoses 28, which tubes 28 are connected at their upper end by quick detachable connections to a manifold 29, FIG. 1, a globe valve 30 being provided at the manifold 29 for each pipe 28 for regulating the amount of chemicals withdrawn from their respective tanks 7.

As shown in FIG. 1, the manifold 29 is disposed below and adjacent the back pressure valve 14, and manifold 29 is connected to the base of the back pressure valve 15 having a conduit 31 therein controlled by a needle 15a which may be raised or lowered to control the amount of chemicals passing through the bore 31; and the bore 31 is connected by pipe 32 to the upper end of the sleeve 20 of the mixing valve, whereby the back pressure regulator 15 will give a constant ratio of chemicals passing to the nozzle N with the water.

As shown in FIG. 3, the back pressure regulator 15 has sections 15b and 15c which are secured together, with the diaphragm 15d disposed therebetween, and the upper end of the needle 15a is secured to the underside of the diaphragm 15d at its center. A spring 15e is disposed around the upper end of the needle 15a between the diaphragm 15d and the base of the regulator normally tending to raise the needle to admit passage of chemicals through the bore 31 and into the sleeve 20 of the mixing valve. At the top of the back pressure regulator 15 is a screw rod 15f controlled by a hand wheel 15g, and a second spring 15h is interposed between the lower end of the screw rod 15f and the top of the diaphragm 15d.

By the above construction the controlled pressure air line is carried through pipe 8g to the back pressure regulator 15 which is installed in the liquid chemical line from either or both tanks 7, and this controlled air pressure when entering the back pressure regulator 15 below the diaphragm 15d will raise the needle 15a in its orifice according to tank pressure and setting of the back pressure regulator screw 15f. It will be noted that there are tension springs 15e, 15h on both sides of the regulator diaphragm 15d with an adjusting wheel 15g on the top side, which adjustment is provided to allow a greater air pressure than water pressure and still dispense a very small ratio of chemicals into the water when desired. The two adjustments, i.e., the air regulator 9 and the back pressure regulator 15 will dispense any desired ratio of chemicals into the water flow, which is very important for many cleaning operations which may require different strengths of chemicals to do the proper cleaning operation. The back pressure regulator 15 will thus give a constant ratio of chemicals regardless of the rate of water being used. This is achieved by providing the tube 26 from the water outlet line 19 beyond the mixing valve to the upper side of the back pressure regulator diaphragm 15d. Thus when the nozzle setting is reduced to a spray, or a small stream of air is being injected into the nozzle, the back pressure will build up on the diaphragm 15d, thereby closing the needle 15a into its orifice, reducing the amount of chemicals entering the water line, the chemicals being injected into the water line 19 through the mixing valve 20 which also acts as a check valve.

We do not limit our invention to the exact form shown in the drawings, for obviously changes may be made therein within the scope of the claims.

We claim:

1. A cleaning and sanitizing machine for mixing a fluid chemical cleaner in any desired ratio with water under pressure and dispensing same into a nozzle having a water valve, while simultaneously directing air under pressure controlled by a nozzle air valve into said nozzle for admixture with the water issuing from the nozzle, comprising a frame; a water pipe in said frame having its inlet connected to a supply of pressurized water, and having its outlet connected to the water inlet of said nozzle, said pipe having a 90° turn therein; a normally closed mixing valve in said 90° turn adapted to be opened in acordance with the flow of water therepast; a back pressure regulator having a diaphragm and having its outlet connected with the 90° turn; a needle valve in said regulator controlled by said diaphragm; a pipe connecting the regulator above the diaphragm with the water pipe beyond the mixing valve to selectively close the needle valve by back pressure in acordance with the pressure of water passing to the nozzle; an air pipe in said frame having an inlet connected to a source of air under pressure and having a main branch connected to the air inlet of said nozzle; a secondary air branch leading from the air inlet to the regulator below the diaphragm for raising the needle valve according to the air pressure in the secondary branch; a globe valve in said secondary branch; a pressure tank in said frame containing the fluid chemical cleaner; a pipe connecting the top of said tank with the secondary branch beyond the globe valve; an air pressure gauge in said secondary branch beyond the globe valve; a dip tube in said tank extending to the bottom thereof; a manifold in the frame having its outlet connected to the inlet of the back pressure regulator in advance of the needle valve; and a valved pipe connecting the upper end of the dip tube with said manifold, whereby the chemical cleaner may be passed from the tank in constant regulated ratio into the water pipe leading to the nozzle when the water is flowing through the nozzle, and whereby when the water flow at the nozzle is shut off the back pressure of the water in advance of the nozzle will close the needle valve.

2. In a machine as set forth in claim 1, said frame having wheels at one end; legs at said one end of the frame to support the frame on the wheels in substantially vertical position when the frame is up-ended; and a shelf at said one end supporting the pressure tanks.

3. In a machine as set forth in claim 1, said mixing valve comprising a plug in the heel of the 90° turn having an axial bore; a tube fixed in said bore having a flared outer end forming a valve seat; a valve stem in said tube having a flared outer end forming a head cooperating with the valve seat; the outlet pipe of the pressure regulator being connected to the bore of the plug above the tube; and means for normally yieldably closing the head valve in its seat when pressure on both sides of the head valve is equal, and when water pressure beyond the head valve exceeds that of the air pressure in advance of the head valve.

4. In a machine as set forth in claim 1, said back pressure regulator comprising a casing having a bore and a seat in the bore for the needle valve, said regulator having a closed chamber; a diaphragm dividing the chamber into upper and lower sections; said needle valve being connected to the center of said diaphragm; opposed springs in said sections respectively bearing against said diaphragm; and means for adjusting the tension of the spring in the upper section to allow greater air pressures than water pressures against said diaphragm to permit dispensing of small ratios of chemical into the water passing to the nozzle.

5. A cleaning and sanitizing machine for mixing a desired amount of fluid chemical cleaner with water under pressure and dispensing same at a desired ratio into a pressure water hose leading to a nozzle having a nozzle water valve, while simultaneously directing air under pressure through an air hose leading into said nozzle and controlled by a nozzle air valve for admixture with the water issuing from the nozzle, comprising a frame; a water pipe in said frame having its inlet adapted to be connected to a supply of water under pressure, and having its outlet connected to the water inlet of said nozzle, said pipe having a T-fitting therein; a normally closed mixing valve in said T-fitting adapted to be opened according to the flow of water therepast; a back pressure regulator having its outlet connected with the T-fitting and having a needle valve therein controlled by a diaphragm; a pipe connecting the regulator above the diaphragm with the water pipe beyond the mixing valve to selectively close the needle valve by back pressure in accordance with the pressure of water passing to the nozzle; an air pipe in said frame having an inlet adapted to be connected to a source of air under pressure and having a main branch connected to the air inlet of said nozzle; a secondary air branch leading from the air inlet to the regulator below the diaphragm tending to raise the needle valve according to the air pressure in the secondary branch; a globe valve in said secondary branch; a plurality of pressure tanks in said frame containing the fluid chemical cleaner; pipes connecting the tops of said tanks with the secondary branch beyond the globe valve; an air pressure gauge in said secondary branch beyond the globe valve; dip tubes extending to the bottoms of the tanks; a manifold in the frame having its outlet connected to the inlet of the back pressure regulator in advance of the needle valve; and valved pipes respectively connecting the upper ends of the dip tubes with said manifold, whereby the chemical cleaner may be passed from the tanks in constant regulated ratios into the water pipe leading to the nozzle when the water is flowing through the nozzle, and whereby when the water flow at the nozzle is shut off the back pressure in the water hose will close the needle valve.

6. In a machine as set forth in claim 5, said frame having wheels at one end; legs at said one end of the frame to support the frame on the wheels in substantially vertical position when the frame is up-ended; and a shelf at said one end supporting the pressure tanks.

7. In a machine as set forth in claim 5, said mixing valve comprising a plug in the end of one branch of the T-fitting having an axial bore; a tube fixed in said bore and extending beyond the lateral branch of the T-fitting, and having a flared outer end forming a valve seat; a valve stem in said tube having a flared outer end forming a head cooperating with the valve seat; the outlet pipe of the pressure regulator being connected to the bore of the plug above the tube; and a spring on the stem between the upper end of the tube and a head on the upper end of the stem for normally yieldably closing the head valve in its seat when pressure on both sides of the head valve is equal, and when water pressure beyond the head valve exceeds that of the air pressure in advance of the head valve.

8. In a machine as set forth in claim 5, said back pressure regulator comprising a casing having a bore and a seat in the bore for the needle valve, said regulator having a closed chamber; a diaphragm dividing the chamber into upper and lower sections; said needle valve being connected to the center of said diaphragm; opposed springs in said sections respectively bearing against said diaphragm; and means for adjusting the tension of the spring in the upper section to allow greater air pressures than water pressures against said diaphragm to permit dispensing of small ratios of chemical into the water passing to the nozzle.

9. A cleaning and sanitizing machine for mixing a desired amount of fluid chemical cleaner with water under pressure and dispensing same at a desired ratio into a pressure water hose leading to a nozzle having a nozzle water valve, while simultaneously directing air under pressure through an air hose leading into said nozzle and controlled by a nozzle air valve for admixture with the water emanating from the nozzle, comprising a frame; a water pipe in said frame having an inlet adapted to be connected to a supply of water under pressure, and having its outlet connected to the water inlet of said nozzle, a normally closed mixing valve in said water pipe in advance of the nozzle adapted to be opened according to the flow of water therepast, and having a valve seat; a back pressure regulator having a diaphragm and having its outlet connected with the valve seat; a needle valve for said seat controlled by said diaphragm; means for selectively closing the needle valve by back pressure in accordance with the flow of water passing to the nozzle; an air pipe in said frame having an inlet adapted to be connected to a source of air under pressure and having a main branch connected to the air inlet of said nozzle; a secondary air branch leading from the air inlet to the regulator below the diaphragm for raising the needle valve according to the air pressure in the secondary branch; a globe valve in said secondary branch; one or more pressure tanks in said frame containing the chemical cleaner fluid; pipes connecting the tops of said tanks with the secondary branch beyond the globe valve; a manifold in the frame having its outlet connected to the inlet of the regulator in advance of the needle valve; and means connecting the bottom ends of the tanks with said manifold respectively whereby the chemical cleaner may be passed from the tanks in constant regulated ratios into the water pipe leading to the nozzle when the water is flowing through the nozzle, and whereby when the water flow is shut off at the nozzle the back pressure in the water hose in advance of the nozzle will close the needle valve.

10. In a machine as set forth in claim 9, said frame having wheels at one end; legs at said one end of the frame to support the frame on the wheels in substantially vertical position when the frame is up-ended; and a shelf at said one end supporting the pressure tanks.

11. In a machine as set forth in claim 9, said mixing valve comprising a plug in the water pipe having an axial bore; a tube fixed in said bore forming the valve seat; a valve stem in said tube having a head at its outer end cooperating with the valve seat; the outlet pipe of the pressure regulator being connected to the bore of the plug; and means for normally yieldably closing the valve in its seat when pressure on both sides of the head valve is equal, and when water pressure beyond the head valve exceeds that of the air pressure in advance of the head valve.

12. In a machine as set forth in claim 9, said back pressure regulator comprising a casing having a bore and a seat in the bore for the needle valve, and having a closed chamber; said diaphragm dividing the chamber into upper and lower sections; said needle valve being connected to the center of said diaphragm; opposed springs in said sections respectively bearing against said diaphragm; and means for adjusting the tension of the spring in the upper section to allow greater air pressures than water pressures against said diaphragm to permit dispensing of small ratios of chemical into the water passing to the nozzle.

No references cited.

LOUIS J. DEMBO, *Primary Examiner.*